(12) United States Patent
Takatori

(10) Patent No.: US 11,758,276 B2
(45) Date of Patent: Sep. 12, 2023

(54) EXPOSURE CONTROL APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventor: Tatsuo Takatori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/727,439

(22) Filed: Apr. 22, 2022

(65) Prior Publication Data
US 2022/0368820 A1 Nov. 17, 2022

(30) Foreign Application Priority Data
Apr. 30, 2021 (JP) ................. 2021-078082

(51) Int. Cl.
*H04N 23/72* (2023.01)
*H04N 23/745* (2023.01)

(52) U.S. Cl.
CPC ........... *H04N 23/72* (2023.01); *H04N 23/745* (2023.01)

(58) Field of Classification Search
CPC ...... H04N 23/72; H04N 23/745; H04N 23/73; H04N 23/76; H04N 23/71
See application file for complete search history.

(56) References Cited

U.S. PATENT DOCUMENTS

2016/0094779 A1* 3/2016 Arakawa .............. H04N 23/675
348/348
2019/0238738 A1* 8/2019 Kunishige .............. H04N 23/69

FOREIGN PATENT DOCUMENTS

JP 2014-042352 A 3/2014

* cited by examiner

*Primary Examiner* — Twyler L Haskins
*Assistant Examiner* — Angel L Garces-Rivera
(74) *Attorney, Agent, or Firm* — Cowan, Liebowitz & Latman, P.C.

(57) ABSTRACT

An exposure control apparatus accepts a specification of a shutter speed, determines, based on the specified shutter speed, a first accumulation time in which an image sensor accumulates a charge for image capture during a live view, determines, based on the specified shutter speed, a second accumulation time in which the image sensor accumulates a charge for image capture when obtaining a still image; and controls the image sensor to accumulate a charge over the first accumulation time or the second accumulation time. The accumulation time that can be set in the image sensor differs between during the live view and when obtaining a still image, and the first determination unit varies a method of determining the first accumulation time according to whether or not the specified shutter speed is longer than a predetermined shutter speed.

15 Claims, 11 Drawing Sheets

FIG. 2

| Step | 1/4 STEP | | | |
|---|---|---|---|---|
| SHUTTER SPEED | 1/8192.0 | 1/6888.6 | 1/5792.6 | 1/4871.0 |

| Step | 1/8 STEP | | | | |
|---|---|---|---|---|---|
| SHUTTER SPEED | 1/4096.0 | 1/3756.0 | ... | 1/2435.5 | 1/2233.4 |

| Step | 1/16 STEP | | | | |
|---|---|---|---|---|---|
| SHUTTER SPEED | 1/2048.0 | 1/1961.2 | ... | 1/1116.7 | 1/1069.3 |

| Step | 1/32 STEP | | | | |
|---|---|---|---|---|---|
| SHUTTER SPEED | 1/1024.0 | 1/1002.1 | ... | 1/534.7 | 1/523.2 |

| Step | 1/64 STEP | | | | |
|---|---|---|---|---|---|
| SHUTTER SPEED | 1/512.0 | 1/506.5 | ... | 1/261.6 | 1/258.8 |

| Step | 1/128 STEP | | | | |
|---|---|---|---|---|---|
| SHUTTER SPEED | 1/256.0 | 1/254.6 | ... | 1/129.4 | 1/128.7 |

| Step | 1/256 STEP | | | | |
|---|---|---|---|---|---|
| SHUTTER SPEED | 1/128.0 | 1/127.7 | ... | 1/50.2 | 1/50.0 |

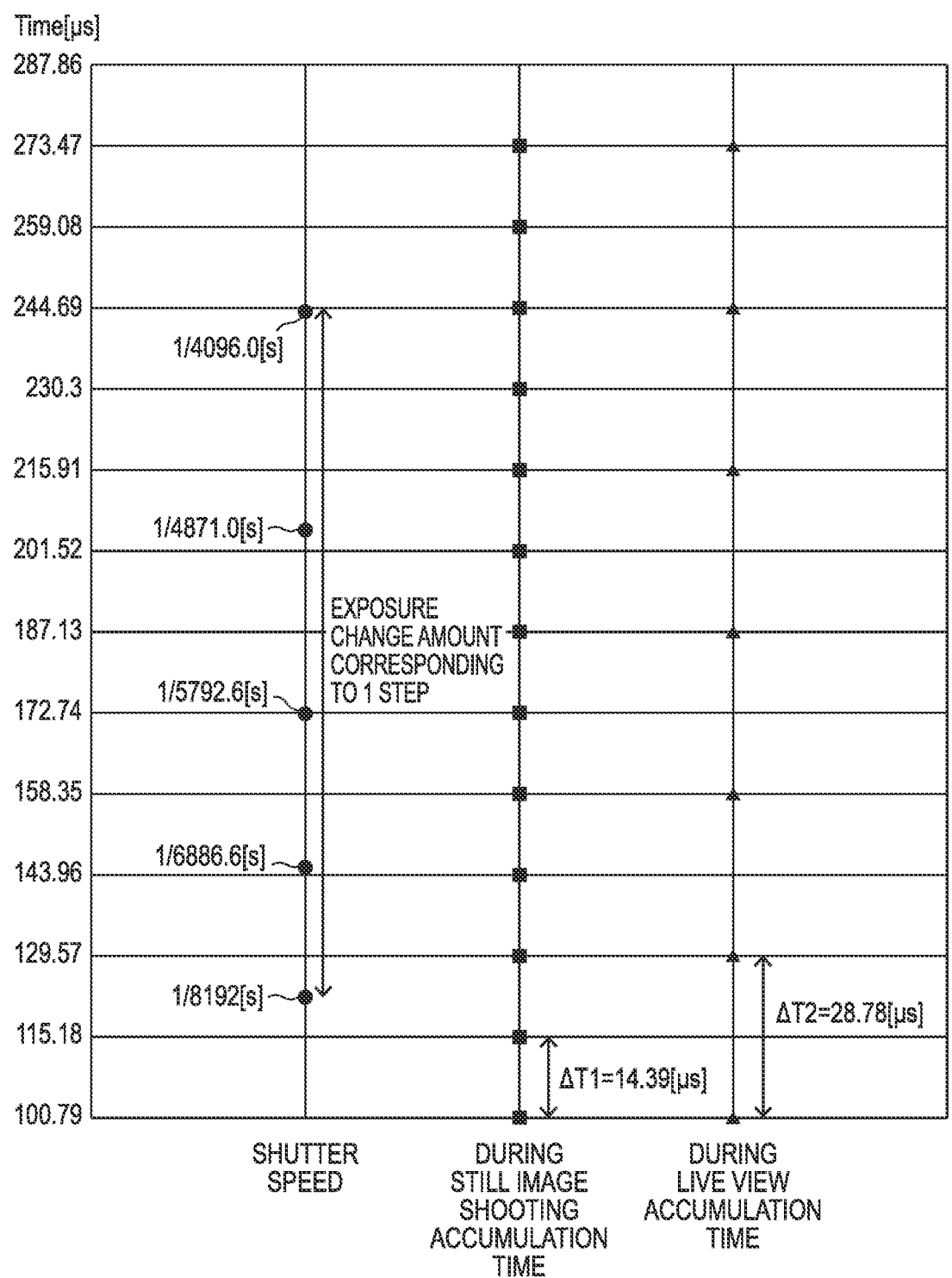

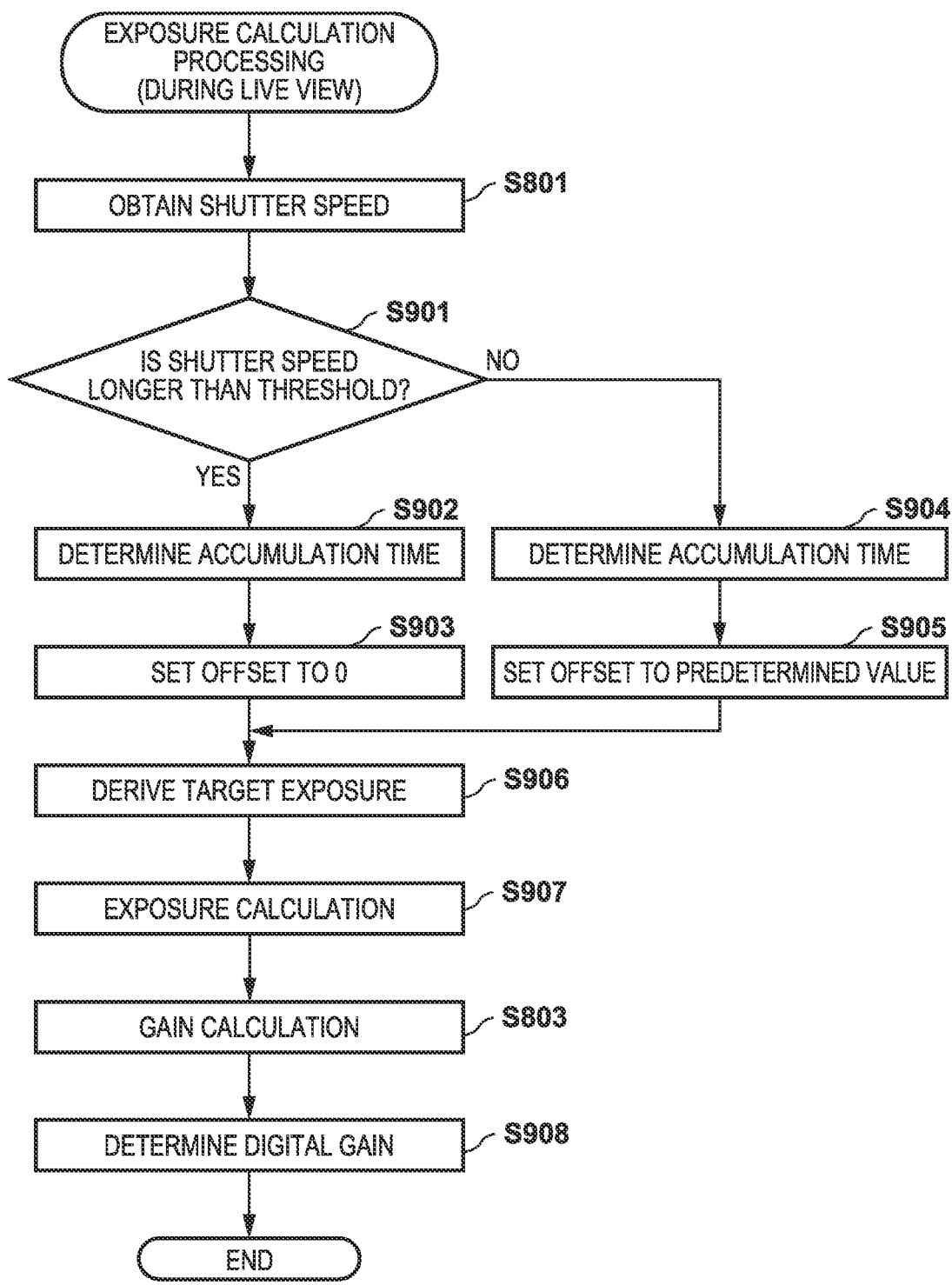

EXPOSURE CONTROL APPARATUS, IMAGE CAPTURING APPARATUS, CONTROL METHOD, AND RECORDING MEDIUM

BACKGROUND OF THE INVENTION

Field of the Invention

The present invention relates to an exposure control apparatus, an image capturing apparatus, a control method, and a recording medium, and in particular relates to an image capturing technique for reducing the influence of flicker caused by illumination.

Description of the Related Art

When capturing images in an environment where a fluorescent lamp is installed, a phenomenon occurs in which the subject flickers in the captured image according to the driving frequency of the fluorescent lamp. To be more specific, fluorescent lamps are driven at a 50/60 Hz commercial power frequency, and thus the cycle at which the light intensity of a fluorescent lamp changes, which appears as the flicker, is 100/120 Hz.

Japanese Patent Laid-Open No. 2014-042352 discloses an image capturing apparatus that can switch to a shutter speed in which the influence of flicker is reduced when flicker is detected when capturing an image at a manually-set shutter speed in order to reduce the effect of flicker on the captured image. The image capturing apparatus of Japanese Patent Laid-Open No. 2014-042352 controls the operation of an image sensor so as to read out images at an accumulation time corresponding to the shutter speed when the shutter speed is switched to a shutter speed that can reduce the influence of flicker, which makes it possible to capture an image with reduced flicker influence.

Incidentally, in recent years, LED light sources are available, in addition to fluorescent lamps, as artificial light sources installed in shooting environments. The flicker caused by an LED light source appears at a higher frequency than that of a fluorescent lamp, e.g., from several kHz to several hundred kHz, and thus to reduce the influence of the flicker, it is necessary to set the shutter speed in a finer unit than that set for fluorescent lamps, i.e., to control the accumulation time of the image sensor.

On the other hand, the width of steps over which the accumulation time of an image sensor can be controlled differs between when obtaining images for "live view" and when obtaining still images. Therefore, if the same accumulation time cannot be set when obtaining live view and still images, the manner in which the influence of flicker in the captured image is reduced may differ between when shooting a live view image and when shooting a still image under an LED light source. This is due to the fact that the number of horizontal lines read out by the image sensor is limited during live view in order to reduce power consumption. Accordingly, even if a user sets the shutter speed based on the captured image displayed in live view, if the conditions of the accumulation time of the image sensor are different during still image shooting, the still image recorded as a result of the shooting may include influence of flicker not intended by the user.

SUMMARY OF THE INVENTION

Having been achieved in light of the foregoing problem, the present invention provides an exposure control apparatus, an image capturing apparatus, a control method, and a program for obtaining a still image in which the influence of flicker is favorably reduced.

The present invention in its first aspect provides an exposure control apparatus comprising: an accepting unit configured to accept a specification of a shutter speed; a first determination unit configured to, based on the specified shutter speed, determine a first accumulation time in which an image sensor accumulates a charge for image capture during a live view; a second determination unit configured to, based on the specified shutter speed, determine a second accumulation time in which the image sensor accumulates a charge for image capture when obtaining a still image; and a control unit configured to control the image sensor to accumulate a charge over the first accumulation time determined by the first determination unit or the second accumulation time determined by the second determination unit, wherein the accumulation time that can be set in the image sensor differs between during the live view and when obtaining a still image, and the first determination unit varies a method of determining the first accumulation time according to whether or not the specified shutter speed is longer than a predetermined shutter speed.

The present invention in its second aspect provides an image capturing apparatus comprising: the exposure control apparatus according to the first aspect; an image capturing unit configured to capture an image using the image sensor; and a recording unit configured to record a still image obtained by image capturing when obtaining a still image.

The present invention in its third aspect provides a control method of an exposure control apparatus, the method comprising: accepting a specification of a shutter speed; determining, based on the specified shutter speed, a first accumulation time in which an image sensor accumulates a charge for image capture during a live view; determining, based on the specified shutter speed, a second accumulation time in which the image sensor accumulates a charge for image capture when obtaining a still image; and controlling the image sensor to accumulate a charge over the first accumulation time or the second accumulation time, wherein the accumulation time that can be set in the image sensor differs between during the live view and when obtaining a still image, and a method of determining the first accumulation time is varied according to whether or not the specified shutter speed is longer than a predetermined shutter speed.

The present invention in its fourth aspect provides a computer-readable recording medium in which is stored a program for causing a computer to function as the units of the exposure control apparatus according to the first aspect.

Further features of the present invention will become apparent from the following description of exemplary embodiments (with reference to the attached drawings).

BRIEF DESCRIPTION OF THE DRAWINGS

FIG. 2 is a diagram illustrating an example of shutter speeds which can be manually set in a high-frequency flickerless mode according to an embodiment, and variations thereon, of the present invention.

FIG. 3A is a diagram illustrating a relationship between a specified shutter speed and an accumulation time that can be set in an image sensor 101 according to an embodiment, and variations thereon, of the present invention.

FIG. 9 is a flowchart illustrating an example of exposure calculation processing during live view, executed by the camera body 100, according to an embodiment of the present invention.

DESCRIPTION OF THE EMBODIMENTS

Figure 1:
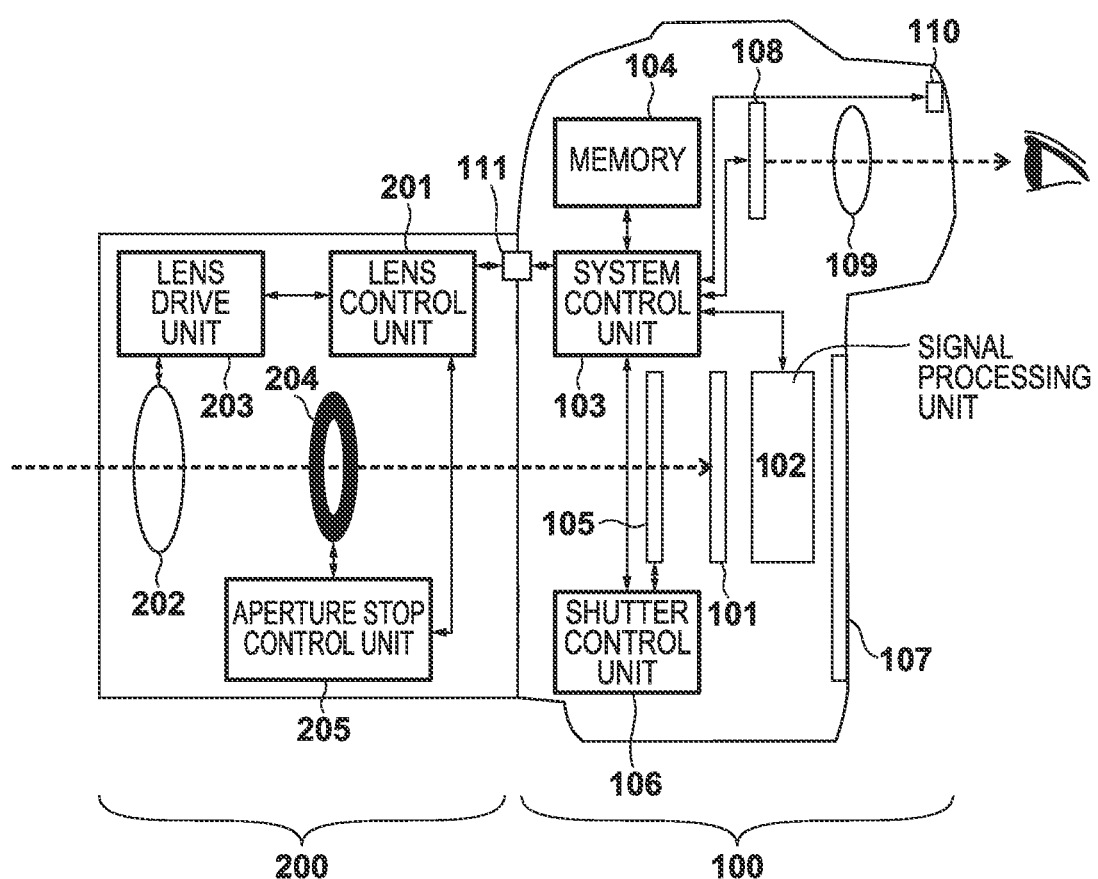
FIG. 1 is a block diagram illustrating the functional configuration of a digital mirrorless camera according to an embodiment, and variations thereon, of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following embodiment describes an example in which the present invention is applied in a digital mirrorless camera, serving as an example of an image capturing apparatus, which includes an image sensor in which different accumulation times can be set between live view and still image shooting, and which has a function for controlling exposure operations of the image sensor. However, the present invention can be applied in any device in which the operations of the image sensor can be controlled, and is not limited to specific types of devices having image capturing functions, such as cellular phones, smartphones, communication terminals, game consoles, and the like.

Functional Configuration of Digital Mirrorless Camera

FIG. 1 is a block diagram illustrating the functional configuration of the digital mirrorless camera according to the present embodiment. In FIG. 1, the digital mirrorless camera is constituted by a camera body 100 and an image capturing lens 200, which are mechanically and electrically connected by a lens mount mechanism 111. In the present embodiment, the image capturing lens 200 is described as being detachable from the camera body 100, but it goes without saying that the present invention is not limited thereto, and that these items may be configured as a single integrated entity.

Configuration of Camera Body 100

A system control unit 103 controls the operations of each block included in the camera body 100. Specifically, the system control unit 103 controls the operations of the respective blocks by reading out operating programs for those blocks that are stored in ROM, loading the programs in a work area of RAM, and executing the programs. The system control unit 103 is also connected to a lens control unit 201 of the image capturing lens 200 by the lens mount mechanism 111, and is configured to send and receive information.

In the present embodiment, memory 104 will be described as including both ROM and RAM, as well as a recording area for recording still images obtained by shooting. More specifically, the memory 104 includes ROM that stores the operating programs, parameters required for the execution of the operating programs, and the like. The memory 104 also includes RAM, which is a work area for loading programs and performing computations, a storage area that temporarily stores intermediate data output from the processing performed by each block, and the like.

An image sensor 101 is a sensor including photoelectric conversion elements, such as a CCD or CMOS sensor, for example. The image sensor 101 captures images by photoelectrically converting an optical image of a subject formed on an image capturing plane through the image capturing lens 200, and outputs an analog image signal. More specifically, the image sensor 101 outputs the analog image signal by accumulating and reading out charges at a set accumulation time. The analog image output by the image sensor 101 is converted into a digital image signal (hereinafter referred to simply as a "captured image") by applying various types of image processing, including A/D conversion processing and development processing, in a signal processing unit 102. The image sensor 101 may also include an infrared cut filter, a low-pass filter, and the like.

A shutter 105 is provided in an optical path of light entering through the image capturing lens 200, and controls the exposure state of the image sensor 101. The shutter 105 is closed when not capturing an image and therefore blocks the image sensor 101, and is open when capturing an image (during live view, during still image shooting or obtainment, and so on), guiding incident light to the image sensor 101. The operation of the shutter 105 is controlled by a shutter control unit 106, which controls the opening and closing of the shutter 105 according to an exposure time determined for capturing an image. To be more specific, the shutter control unit 106 controls the opening and closing of the shutter 105 based on information on the shutter speed pertaining to exposure conditions determined by the system control unit 103, and as a result, the image sensor 101 is exposed for a predetermined time and receives a light flux corresponding to an optical image of the subject. Although the example in FIG. 1 illustrates a configuration in which the exposure control of the image sensor 101 is performed using what is known as a mechanical shutter, the exposure control may also be performed using what is known as an electronic shutter, which is implemented by controlling the accumulation of the image sensor 101.

A rear display unit 107 and a viewfinder display unit 108 are display devices, such as TFT liquid crystal panels or the like, for example. The rear display unit 107 is provided on the exterior of the camera body 100, and a user can easily check displays made therein. On the other hand, the viewfinder display unit 108 is an electronic viewfinder configured to be visible through an eyepiece 109, and it is necessary for the user to look at the eyepiece 109 to check displays made therein. These display devices provide a live view display by sequentially displaying captured images obtained through image capturing when the camera body 100 is set to an image capturing mode and started up.

It is assumed that during live view, control is performed such that a display is made in either the rear display unit 107 or the viewfinder display unit 108, and which of these is used for the display is switched according to whether the user's eye is near the eyepiece. In the camera body 100 of the present embodiment, an eye proximity detection unit 110 is provided in the vicinity of the eyepiece 109 such that whether the user's eye is near or not can be detected. Therefore, the viewfinder display unit 108 is used for the live view display during the period when the eye proximity detection unit 110 detects that an eye is near, and the rear display unit 107 is used for the live view display during the period when an eye is not detected as being near. In addition, the rear display unit 107 and the viewfinder display unit 108 may be used to display shooting results (still images) during still image shooting.

Configuration of Image Capturing Lens 200

The lens control unit 201 is a control device such as a microchip includes, for example, ROM, RAM, and the like (not shown), and controls the operations of each block in the image capturing lens 200. The lens control unit 201 also exchanges information related to focal position and aperture (AE/AF) control through a communication connection with the system control unit 103.

A focusing lens 202 is moved in an optical axis direction based on information on the focal position to change a focus state of a captured image. A lens drive unit 203 controls the movement of the focusing lens 202. An aperture stop 204 adjusts a light amount of the light flux incident on the image sensor 101 of the camera body 100 by changing an open state according to an aperture value. The open state of the aperture stop 204 is controlled by an aperture control unit 205.

The present embodiment will describe processing as being implemented by hardware such as circuits, processors, and so on corresponding to the blocks included in the camera body 100 or the image capturing lens 200. However, the present invention is not limited thereto, and the processing by at least some of the blocks may be implemented by programs that carry out similar processing as those blocks.

Overview of Exposure Control

The following will describe exposure control performed by controlling the accumulation time of the image sensor 101 in the digital mirrorless camera of the present embodiment, with reference to the drawings.

The digital mirrorless camera of the present embodiment includes, as one image capturing mode, a manual mode which enables exposure conditions to be set manually. In the present embodiment, it is assumed that at least the shutter speed can be set to a specified value in manual mode. In addition to the image capturing mode, the digital mirrorless camera includes a mode for reducing the influence of flicker (a high-frequency flickerless mode) when capturing images in a shooting environment that may cause high-frequency flicker, such as under LED light sources. In the manual mode, the shutter speed can normally be specified in $½$ or $⅓$ steps, but when the high-frequency flickerless mode is set, the camera is configured such that the shutter speed can be specified in finer steps. In other words, by having a configuration which enables the shutter speed to be specified in finer steps than normal, the user can make more precise adjustments to determine a shutter speed that reduces the influence of flicker. In other words, because flicker caused by LED light sources and the like occurs at various frequencies, the digital mirrorless camera of the present embodiment enables users to more finely adjust the shutter speed to match the shooting environment while checking the live view display. That is, the user can identify a suitable shutter speed that reduces the influence of flicker while varying the shutter speed settings and checking the captured image obtained at those shutter speed settings and displayed in the live view display, and then shoot the final still image.

The shutter speeds which can be specified by the user in the high-frequency flickerless mode may be those illustrated in FIG. 2. As illustrated in FIG. 2, the number of steps that can be specified varies according to the length of a reference shutter speed, and the configuration is such that longer shutter speeds enable adjustments to be made in finer steps. In the example illustrated in FIG. 2, the shutter speed can be adjusted in $¼$ steps from 1/8192.0 [s] to 1/4871.0 [s]. The shutter speed can be adjusted in $⅛$ steps from 1/4096.0 [s] to 1/2233.4 [s]. The shutter speed can be adjusted in $1/16$ steps from 1/2048.0 [s] to 1/1069.3 [s]. The shutter speed can be adjusted in $1/32$ steps from 1/1024.0 [s] to 1/523.2 [s]. The shutter speed can be adjusted in $1/64$ steps from 1/512.0 [s] to 1/258.8 [s]. The shutter speed can be adjusted in $1/128$ steps from 1/256.0 [s] to 1/128.7 [s]. The shutter speed can be adjusted in $1/256$ steps from 1/128.0 [s] to 1/50.0 [s]. Hereinafter, in the present embodiment, it is assumed that such exposure according to the shutter speed is achieved by controlling the accumulation time of the image sensor 101 to a corresponding value.

Incidentally, the accumulation times that can be set for the image sensor 101 vary depending on the operating conditions thereof. More specifically, the readout mode of the image sensor 101 differs between live view, in which the captured images obtained through repeated image capture are displayed sequentially, and still image shooting, which is performed to record a single still image, and as such, the step width of the accumulation time that can be set differs as well.

Because images are captured frequently during live view and more power may be used for the image capturing operations, the image sensor 101 is generally controlled to perform thinned readout operations or arithmetic mean readout operations during live view. In other words, power consumption is reduced by limiting the number of horizontal lines read out from the image sensor 101 to a smaller number than that used during still image shooting.

Here, the control cycle of charge accumulation of the image sensor 101 can only be controlled at the readout timing of the horizontal lines, and thus the control cycle is longer during live view, when the number of horizontal lines to be read out is smaller than when shooting a still image, than during still image shooting. Accordingly, the accumulation time that can be set in the image sensor 101 during live view has a larger step width than that which can be set during still image shooting, and the accuracy of selecting the accumulation time corresponding to the specified shutter speed may decrease.

The following will describe a relationship between the shutter speed and the accumulation time that can be set for the image sensor 101, assuming that the time required to read out one horizontal line is 14.39 [μs] and that the number of horizontal lines read out is reduced by thinning out one line or adding two lines during live view. In other words, the step width of the accumulation time that can be set for the image sensor 101 during still image shooting is ΔT1=14.39 [μs], and the step width of the accumulation time that can be set for the image sensor 101 during live view is ΔT2=28.78 [μs].

Figure 3B:
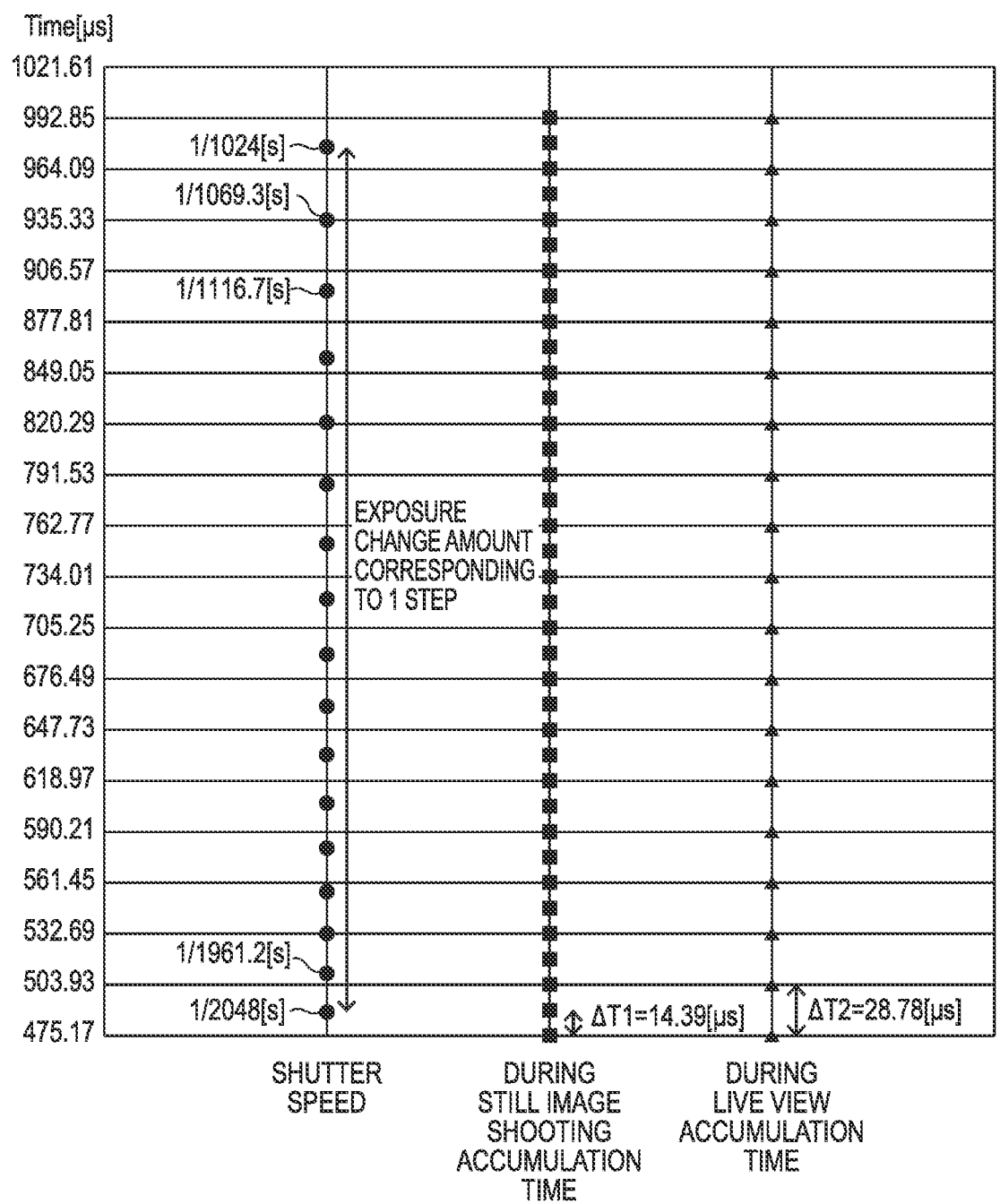
FIG. 3B is another diagram illustrating a relationship between a specified shutter speed and an accumulation time that can be set in the image sensor 101 according to an embodiment, and variations thereon, of the present invention.

For example, when a shutter speed between 1/8192.0 [s] and 1/4871.0 [s] is specified in the high-frequency flickerless mode, the relationship between the accumulation times that can be set for the image sensor 101 is as illustrated in FIG. 3A. Likewise, for example, when a shutter speed between 1/2048.0 [s] and 1/1024.0 [s] is specified, the relationship between the accumulation times that can be set for the image sensor 101 is as illustrated in FIG. 3B. These figures illustrate, in order from the left side, the specified shutter speed, the control cycle of the accumulation time that can be set during still image shooting, and the control cycle of the accumulation time that can be set during live view. More specifically, the accumulation time that is actually set in the image sensor 101 for the specified shutter speed is selected from the corresponding accumulation time among the accumulation times that can be set.

Simply by selecting an accumulation time that is closest to the specified shutter speed, an image that is close to the user's intended exposure conditions (shutter speed) can be captured. At this time, if there is a difference between the specified shutter speed and the selected accumulation time, the resulting captured image will show a different exposure state from the specified shutter speed (an exposure difference will arise). Such an exposure difference is not a problem in still images, for example, to which the user can apply any desired image processing after shooting. However, for a captured image for temporary use as a live view display, changes in the way the exposure is expressed should be even in accordance with changes in the shutter speed, and thus image processing for reducing exposure differences is necessary during live view. Accordingly, in the camera body 100 of the present embodiment, during live view, processing is performed to adjust the exposure state of the images displayed in the live view display by applying digital gain to the captured image in accordance with the difference between the specified shutter speed and the accumulation time actually set in the image sensor 101. As a result, the exposure state of the image displayed in live view is adjusted to be equivalent to the exposure at the specified shutter speed.

Incidentally, changing the exposure state by applying digital gain is performed by multiplying a signal value (pixel value) of the digital image signal (the captured image) by a numerical value of the digital gain. In other words, when the set accumulation time is shorter than the specified shutter speed, a digital gain that increases the signal value (increases the exposure) (called "positive direction digital gain" hereinafter) is applied. On the other hand, when the set accumulation time is longer than the specified shutter speed, a digital gain that reduces the signal value (lowers the exposure) (called "negative direction digital gain" hereinafter) is applied.

However, when applying negative direction digital gain, a drop in image quality (reduced resolution, pixel value compression, and the like) will occur in the resulting image. As such, it is generally considered favorable to select an accumulation time shorter than the shutter speed to avoid applying negative direction digital gain, and to generate images for live view display by applying positive direction digital gain instead. Therefore, the selection criteria for the accumulation time of the image sensor 101 corresponding to the specified shutter speed differ in that the accumulation time closest to the shutter speed in question is selected during still image shooting, and the longest accumulation time among the accumulation times shorter than the shutter speed in question is selected during live view.

On the other hand, because the accumulation time that can be set for the image sensor 101 differs between still image shooting and live view as described above, the following problems can occur as a result of having different selection criteria for the accumulation times between still image shooting and live view.

Figure 4A:
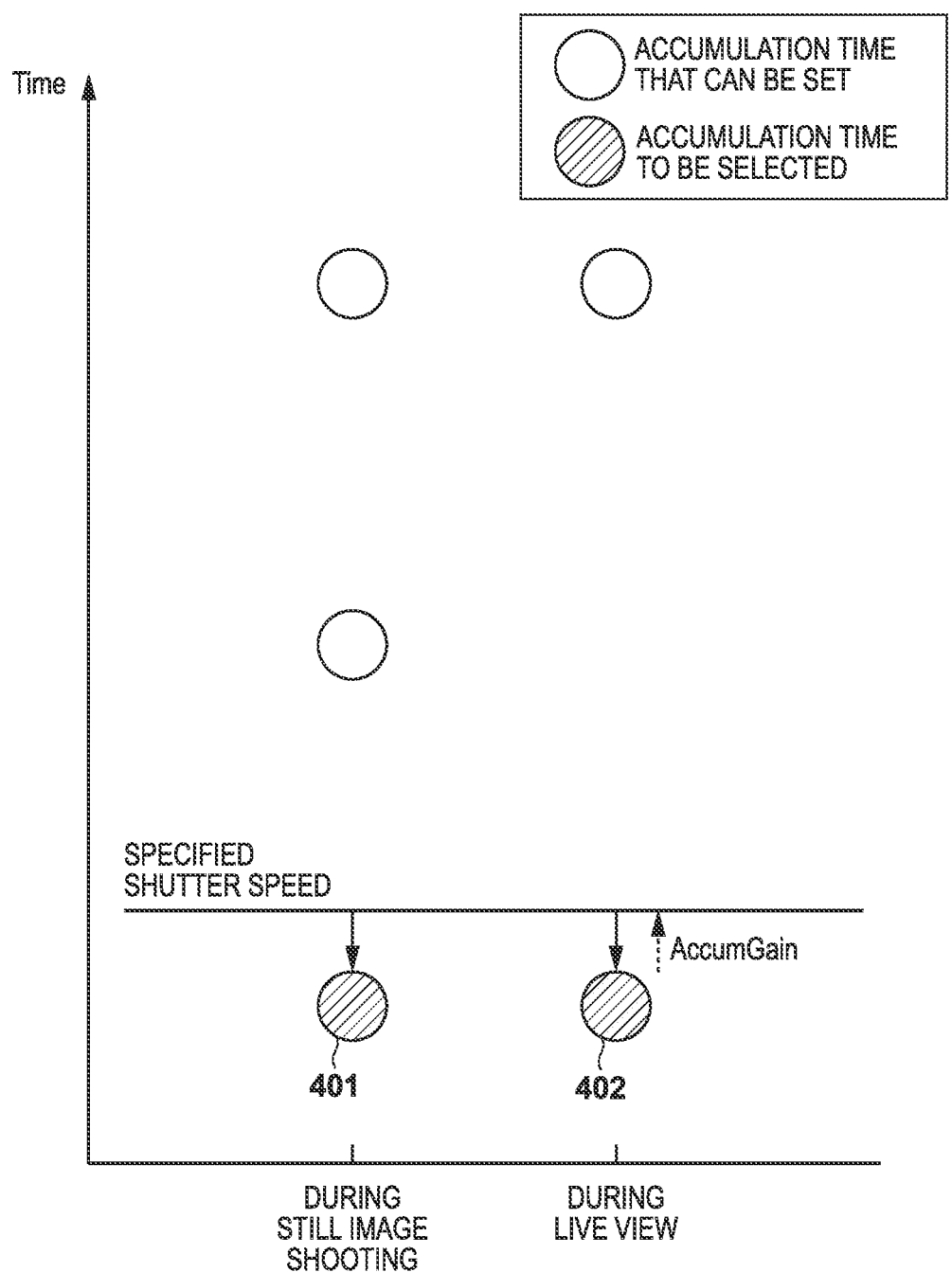
FIG. 4A is a diagram illustrating a difference in accumulation times between still image shooting and live view according to an embodiment, and variations thereon, of the present invention.
Figure 4B:
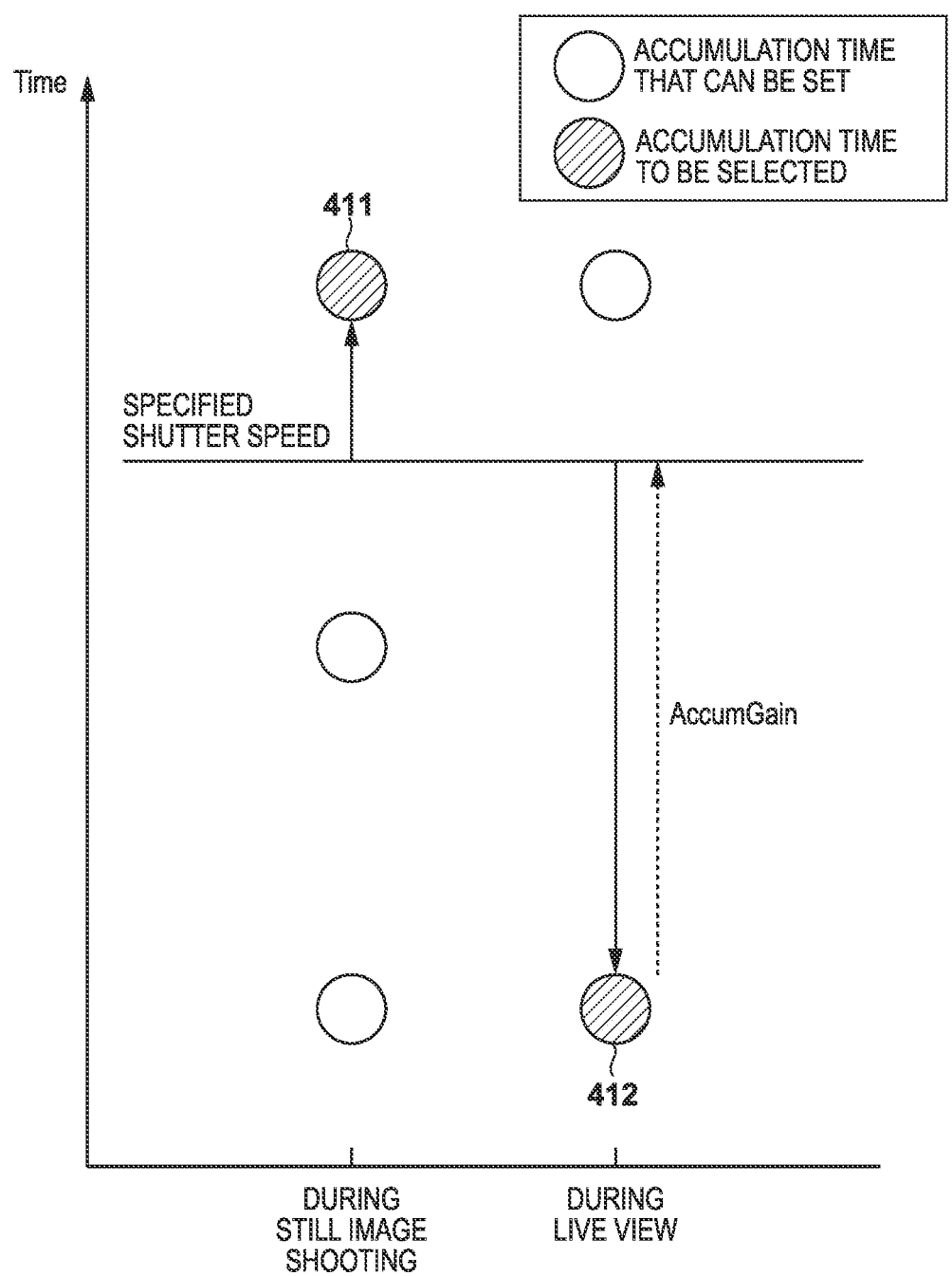
FIG. 4B is another diagram illustrating a difference in accumulation times between still image shooting and live view according to an embodiment, and variations thereon, of the present invention.

If the relationship between the specified shutter speed, and the accumulation times which can be selected during still image shooting and during live view, is as illustrated in FIG. 4A, then an accumulation time 401 selected during still image shooting and an accumulation time 402 selected during live view will be the same. On the other hand, if the relationship between the specified shutter speed, and the accumulation times which can be selected during still image shooting and during live view, is as illustrated in FIG. 4B, then an accumulation time 411 selected during still image shooting and an accumulation time 412 selected during live view will be different. In the readout mode during live view in the present embodiment, a difference in accumulation times of up to ΔT2 can occur between still image shooting and live view, as illustrated in FIG. 4B.

In other words, such a difference in the selection criteria for the accumulation time makes it difficult to set an appropriate shutter speed in a state where the user sets the shutter speed to reduce the influence of flicker while checking the live view display. To be more specific, when different accumulation times are set in the image sensor 101 for still image shooting and live view, even if the influence of flicker is appropriately reduced in the image displayed in live view, the state of the reduction may not be the same in the still image shot thereafter. This occurs regardless of the application of digital gain to change the exposure to the equivalent of the specified shutter speed.

The camera body 100 of the present embodiment performs processing in which the method of determining the accumulation time during live view is varied according to the specified shutter speed in order to reduce such differences in the way the influence of flicker is reduced arising between an image displayed in live view and a still image. In other words, the camera body 100 performs exposure control such that the difference in the accumulation times set for the image sensor 101 between live view and still image shooting does not reach a level that produces a difference in the visibility of the influence of flicker in the captured image.

As a result of experiments conducted by the applicant, it was confirmed that if the difference in accumulation times during live view and during still image shooting is less than 1/16 step, the difference in the influence of flicker in the captured image becomes less visible. Therefore, if the maximum difference in accumulation time (ΔT2) resulting from the aforementioned selection criteria for accumulation time is a shutter speed less than 1/16 step, the state of reducing the influence of flicker during live view and during still image shooting can be regarded as similar even if the stated selection criteria are employed. On the other hand, if ΔT2, i.e., the control cycle of charge accumulation during live view, is a shutter speed greater than 1/16th step, there will be a non-negligible difference in the way the influence of flicker is reduced when the stated selection criteria are employed. In other words, the stated selection criteria are effective when the shutter speed is longer than a predetermined shutter speed (where differences in the way the influence of flicker is reduced), but not when the shutter speed is shorter than the predetermined shutter speed. Here, when ΔT2=28.78 [μs], the predetermined shutter speed is 1/693.4 [s], and the camera body 100 of the present embodiment uses that shutter speed as a threshold TVth for switching the method of determining the accumulation time.

Accordingly, when the specified shutter speed is shorter than the predetermined shutter speed, the camera body 100 of the present embodiment varies the selection criteria for the accumulation time during live view so that the difference in the accumulation times between live view and still image shooting is reduced. Specifically, at the stated shutter speed, control is performed so as to select the accumulation time closest to the specified shutter speed both during live view and during still image shooting. Note that in this case, because a longer accumulation time than the shutter speed can be selected during live view, a fixed offset ΔK is added to the digital gain to avoid negative direction digital gain, and exposure control is performed for other elements to cancel out the corresponding increase in the exposure amount.

Data Flow for Exposure Control

Figure 5:
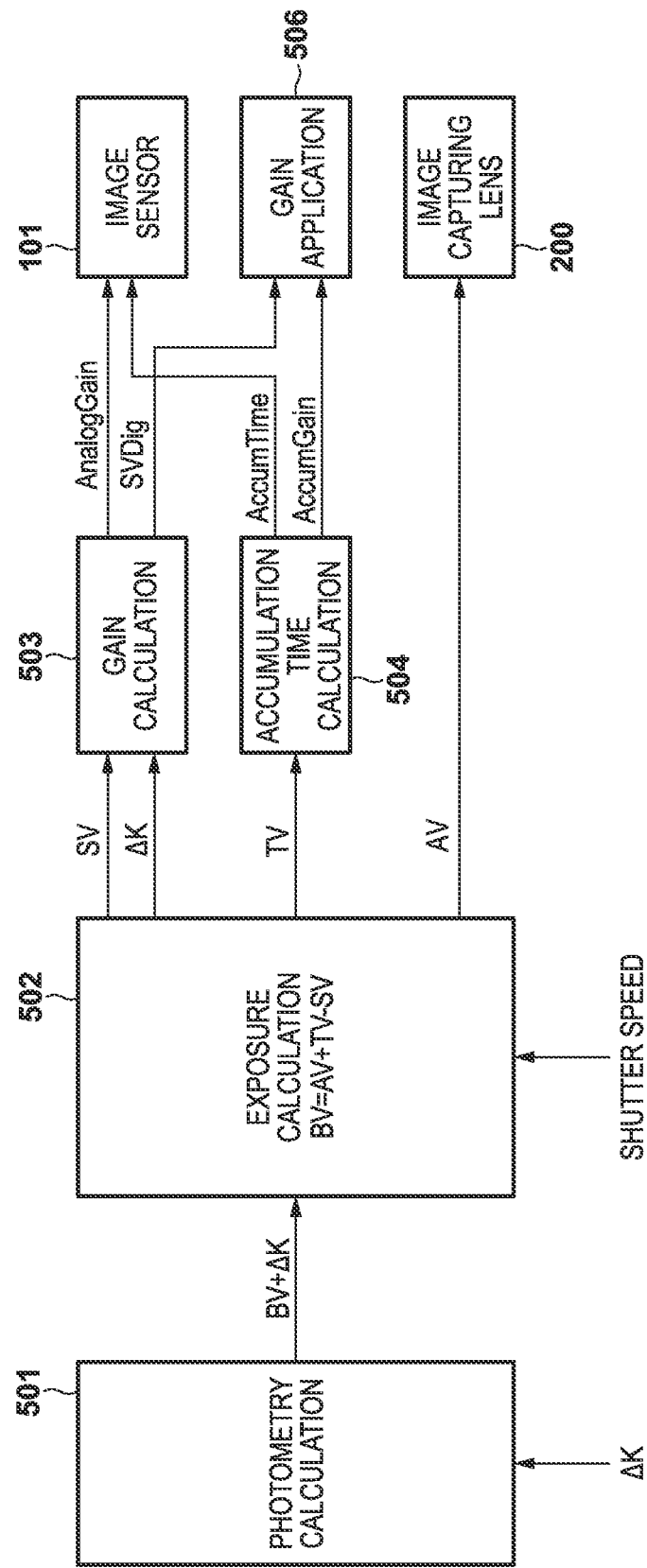
FIG. 5 is a diagram illustrating an example of the data flow of processing related to exposure control performed by a camera body 100 according to an embodiment, and variations thereon, of the present invention.

Processing pertaining to the exposure control performed by the camera body 100 of the present embodiment will be described hereinafter with reference to the data flow chart in FIG. 5. Although the present embodiment describes the various processing illustrated in FIG. 5 as being executed by the system control unit 103, the present invention is not limited thereto, and the processing may be implemented by other circuitry or the like. Additionally, information on a manually-specified shutter speed TV and the offset ΔK used in various processing is assumed to be obtained from the memory 104.

First, when the shutter speed is specified, a photometric value (subject luminance) BV is derived in photometry calculation 501, and a target exposure, which is a reference for the exposure control, is determined. The derivation of the photometric value BV may be based on the luminance of the entirety of the captured image, for example. Here, the "luminance" may be a luminance signal calculated by multiplying the R, G, and B signals of a Bayer array RAW image by a set coefficient, or may be the R, G, and B signals themselves. A sensor array other than the Bayer array may also be used.

As described above, in the camera body 100 of the present embodiment, the offset ΔK is added to the digital gain during live view when the specified shutter speed is shorter than a threshold. Accordingly, the target exposure determined by the photometry calculation 501 will be the photometric value BV when the specified shutter speed is longer than the threshold, and the photometric value BV+the offset ΔK when the specified shutter speed is shorter than the threshold.

Once the target exposure is determined, in exposure calculation 502, exposure control calculations are performed using the specified shutter speed TV and the target exposure BV (+ΔK), based on the following APEX relational expression.

$$BV(+\Delta K)=AV+TV-SV$$

In other words, an aperture value AV and an ISO sensitivity SV are determined in the exposure calculation 502. The various control values used for the exposure control are determined as a result. Note that the aperture value AV is transmitted to the image capturing lens 200.

When the exposure control value is set, in gain calculation 503, an analog gain to be set for the image sensor 101 is derived based on the sensitivity SV. Because operational constraints of the image sensor 101 limit the analog gain that can be set in the image sensor 101, the analog gain may be insufficient for the sensitivity SV derived in the exposure calculation 502. Accordingly, in the gain calculation 503, a digital gain SVDig is derived to compensate for the degree of exposure (related to sensitivity) that is insufficient in the analog gain. That is, in the gain calculation 503, the digital gain SVDig for the sensitivity is derived based on a difference between the sensitivity SV and the analog gain.

Once the exposure control value is set, in accumulation time calculation 504, an accumulation time AccumTime to be set for the image sensor 101 is determined. As described above, the determination of the accumulation time in the accumulation time calculation 504 is selected based on the specified shutter speed TV, from among the accumulation times which can be set (and which differ between live view and still image shooting). In addition, in the accumulation time calculation 504, a digital gain AccumGain for exposure is derived to compensate for an exposure difference caused by a difference between the determined accumulation time and the specified shutter speed TV.

The method of deriving the digital gain AccumGain for the exposure differs depending on whether the specified shutter speed is longer than the threshold, in order to avoid negative direction digital gain as described above. The differences in the digital gain AccumGain for exposure according to the method of determining the accumulation time during live view will now be described here with reference to FIG. 6.

Figure 6:
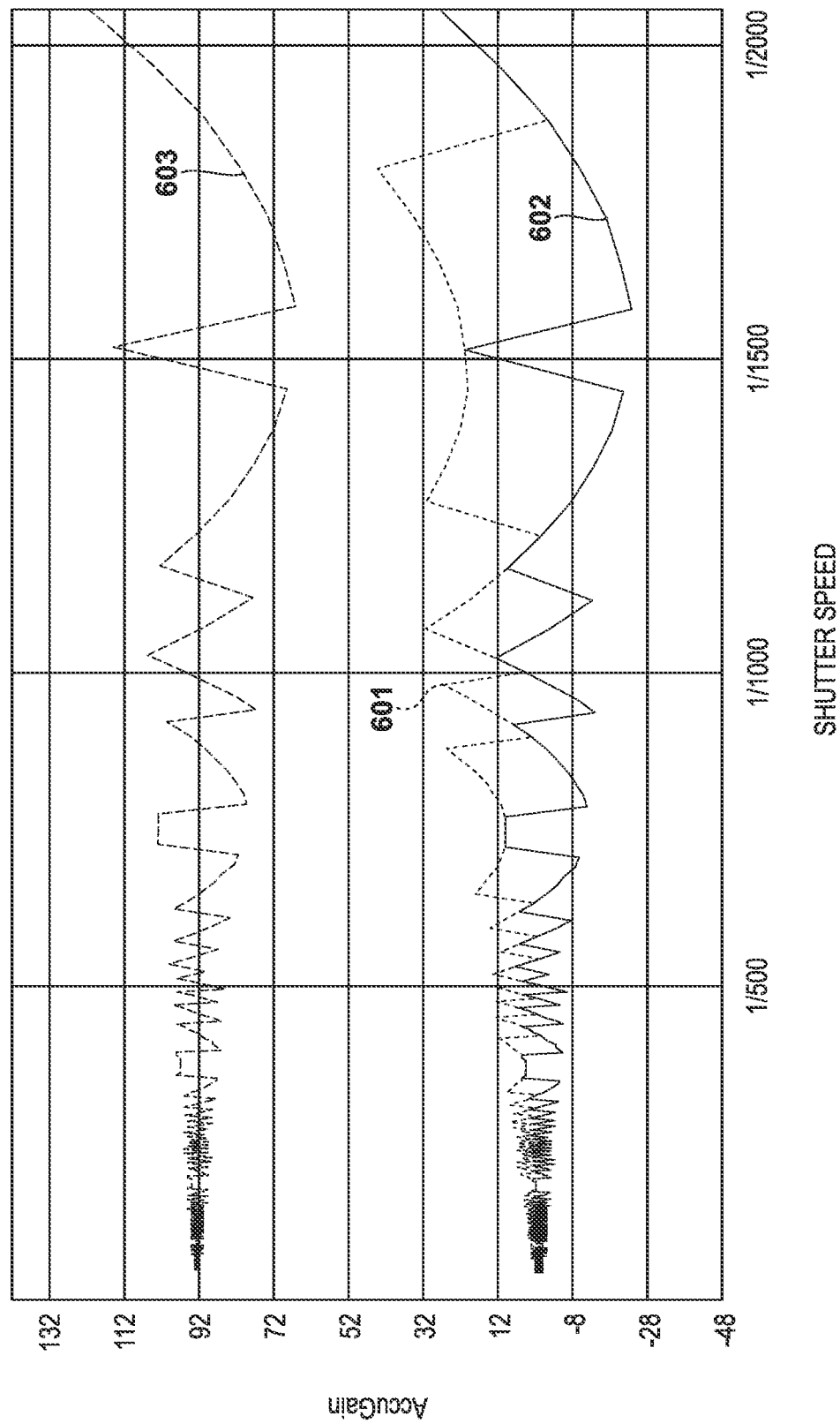
FIG. 6 is a diagram illustrating digital gain for exposure based on a method of determining an accumulation time of the image sensor 101 according to an embodiment, and variations thereon, of the present invention.

If the accumulation time is determined by a method that selects the longest accumulation time, among the accumulation times which can be set, that does not exceed the specified shutter speed TV, the digital gain AccumGain for the exposure will be as indicated by the broken line 601. As illustrated in FIG. 6, the broken line 601 represents positive direction digital gain arising regardless of which shutter speed is specified. On the other hand, if the accumulation time is determined by a method that selects the shortest accumulation time among the accumulation times which can be set, including an accumulation time that exceeds the specified shutter speed, the digital gain AccumGain for the exposure will be as indicated by the solid line 602. As illustrated in FIG. 6, the solid line 602 includes both the positive direction digital gain and the negative direction digital gain, depending on the specified shutter speed. Also, as illustrated in FIG. 6, the shorter the specified shutter speed is, the greater the discrepancy between the specified shutter speed and the set accumulation time becomes, which results in a greater amount of compensation in the digital gain AccumGain for exposure. Hereinafter, the former method of determining the accumulation time will be called a "first determination method", and the latter method of determining the accumulation time will be called a "second determination method".

As described above, the camera body 100 of the present embodiment determines the accumulation time through the first determination method when the specified shutter speed is longer than the threshold, and determines the accumulation time through the second determination method when the specified shutter speed is not longer than the threshold. Accordingly, in the latter case, because the digital gain AccumGain for exposure can be a negative direction digital gain, the value is changed to a value with the offset ΔK added as indicated by the dot-dash line 603, and the digital gain is positive direction digital gain at all shutter speeds. For this reason, the offset ΔK, which is a fixed value, is set to a value to which negative direction digital gain is not applied shutter speeds near the highest speed that can be specified. In other words, the offset ΔK is determined to be a value at which the signal value after application exceeds the signal value before application when the digital gain AccumGain for exposure is applied to the image signal.

The analog gain derived in the gain calculation 503 and the accumulation time AccumTime determined in the accumulation time calculation 504 are supplied to the image sensor 101 and used for processing related to image capture, which involves charge accumulation operations and analog image signal output.

Additionally, when an image is captured by the image sensor 101 and the digital image signal pertaining to the captured image is output by the signal processing unit 102, digital gain is applied in gain application 505. To be more specific, in the gain application 505, the final digital gain, which is obtained by multiplying the digital gain SVDig for the sensitivity and the digital gain AccumGain for the exposure, is applied to the digital image signal.

Note that the application of digital gain is a software-based amplification of the digital image signal and is more prone to noise than analog gain, which amplifies the charge in the image sensor 101. Accordingly, the various data flows related to digital gain may be carried out only during live view.

Image Capturing Processing

Figure 7:
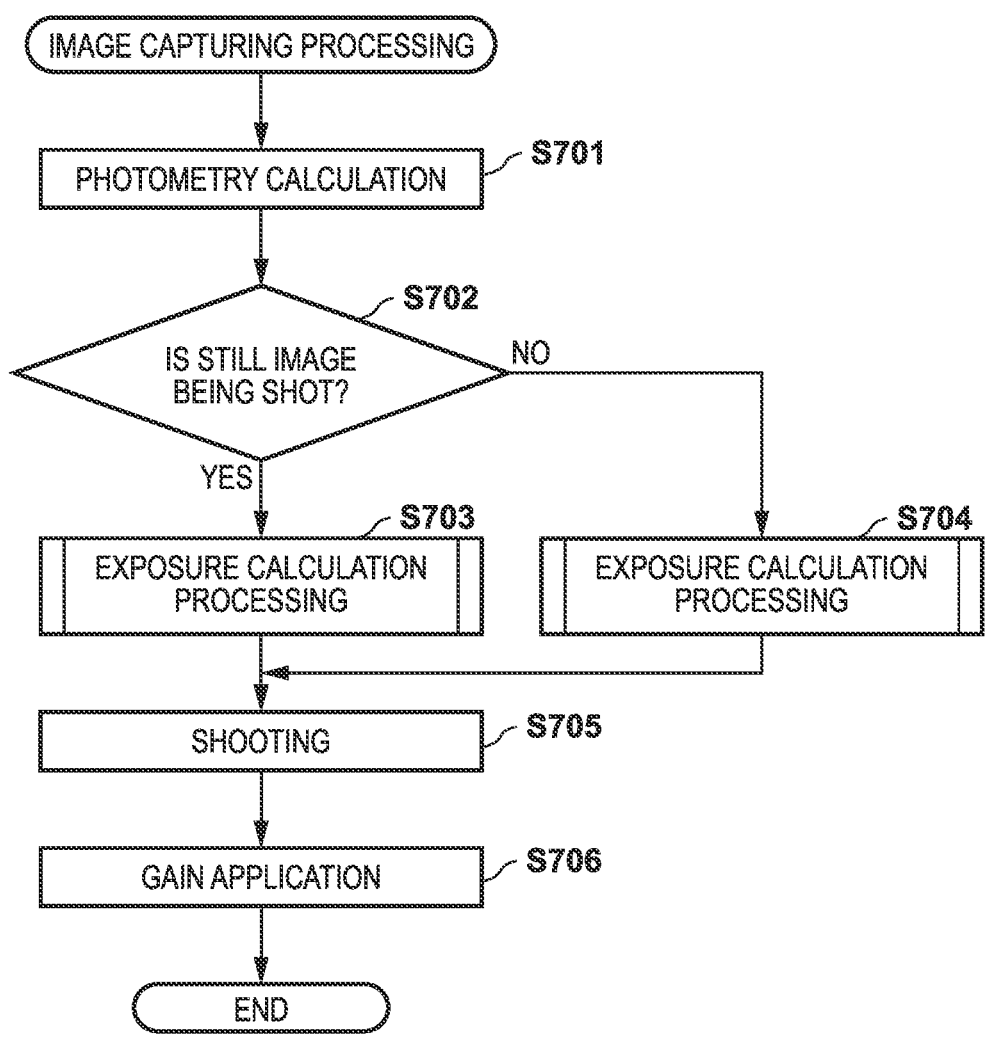
FIG. 7 is a flowchart illustrating an example of image capturing processing executed by the camera body 100 according to an embodiment of the present invention.

The specific image capturing processing performed in the high-frequency flickerless mode of the digital mirrorless camera of the present embodiment having this configuration will be described with reference to the flowchart in FIG. 7. The processing corresponding to the flowchart can be realized by, for example, the system control unit 103 reading out a corresponding processing program stored in ROM, for example, loading the program into RAM, and executing the program.

Note that this image capturing processing will be described as starting when the camera body 100 is set to high-frequency flickerless mode after being started in the image capturing mode, for example. Here, the high-frequency flickerless mode may be set, for example, as follows. When started up in the image capturing mode, the system control unit 103 detects the frequency of flicker occurring by converting a group of flicker detection images, which are captured at different framerates, into frequency components. Then, the system control unit 103 may propose a shutter speed that reduces the influence of the flicker via the rear display unit 107, and set the camera to the high-frequency flickerless mode when the user changes the setting to the proposed shutter speed.

In step S701, the system control unit 103 performs a photometry calculation to measure the brightness of the subject and derives the photometric value By.

In step S702, the system control unit 103 determines whether or not a still image is being shot. If the system control unit 103 determines that a still image is being shot, the processing moves to step S703, and the exposure calculation processing for still image shooting is executed. However, if the system control unit 103 determines that a still image is not being shot, i.e., that the camera is in live view, the processing moves to step S704, and the exposure calculation processing for live view is executed.

Exposure Calculation Processing (During Still Image Shooting)

Figure 8:
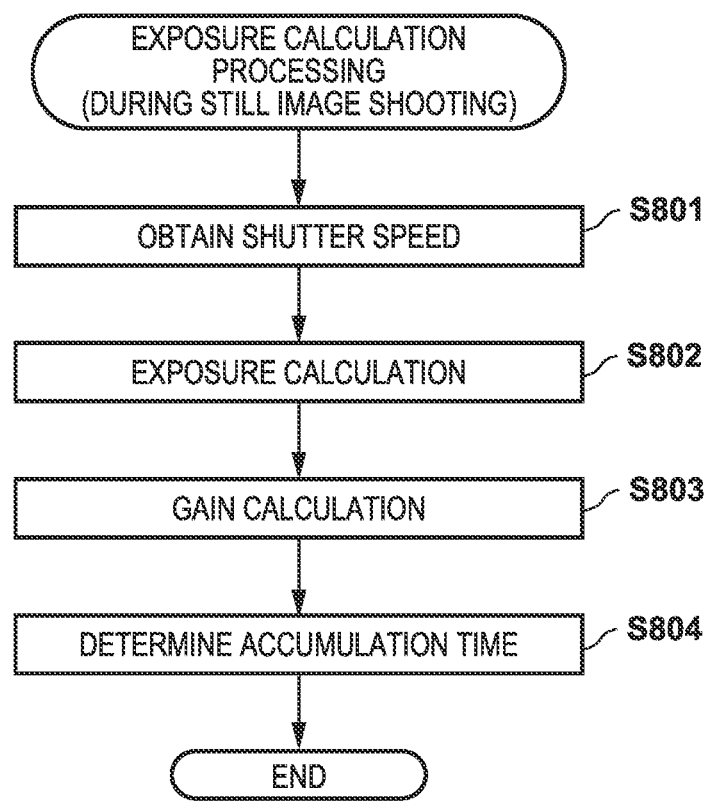
FIG. 8 is a flowchart illustrating an example of exposure calculation processing during still image shooting, executed by the camera body 100, according to an embodiment of the present invention.

Here, the exposure calculation processing during still image shooting, which is executed in step S703, will be described further with reference to the flowchart in FIG. 8. As described above, because digital gain is not applied during still image shooting, the exposure calculation processing only determines each exposure control value, the analog gain for sensitivity, and the accumulation time of the image sensor 101, as described hereinafter.

In step S801, the system control unit 103 obtains the shutter speed TV specified by the user. The shutter speed TV may be specified by displaying a GUI that enables the shutter speed to be selected using the rear display unit 107 in response to a user making an operation input through the GUI, for example. In other words, the system control unit 103 functions as an accepting unit according to the present invention, and accepts the specification of a shutter speed.

In step S802, the system control unit 103 performs exposure calculation based on the photometric value BV derived in step S701 of the image capturing processing and the specified shutter speed TV, and derives the exposure control values for aperture and sensitivity (AV and SV). Here, the photometric value BV is used as the target exposure in the exposure calculation processing during still image shooting.

In step S803, the system control unit 103 performs a gain calculation based on the exposure control value SV for the sensitivity derived in step S802, and derives the analog gain to be set for the image sensor 101.

In step S804, based on the specified shutter speed TV, the system control unit 103 determines the accumulation time to be set for the image sensor 101 as a second accumulation time according to the present invention. To be more specific, the system control unit 103 determines the accumulation time, among the accumulation times that can be set during still image shooting, which has the smallest difference from the specified shutter speed TV, as the accumulation time to be set for the image sensor 101. That is, during still image shooting, the accumulation time set for the image sensor 101 is determined through the second determination method.

Exposure Calculation Processing (During Live View)

Next, the exposure calculation processing during live view, which is executed in step S704, will be described further with reference to the flowchart in FIG. 9. As described above, because digital gain is applied during live view, the exposure calculation processing determines each exposure control value, the analog gain for sensitivity, and the accumulation time of the image sensor 101, and furthermore determines the digital gain for exposure and applies the digital gain, as will be described hereinafter. Note that in the exposure calculation processing during live view, steps that perform processing similar to that performed during still image shooting are indicated by the same reference numerals, and will not be described.

When the specified shutter speed TV is obtained in step S801, in step S901, the system control unit 103 determines whether the specified shutter speed TV is longer than the threshold TVth. If the system control unit 103 determines that the specified shutter speed TV is longer than the threshold TVth, the processing moves to step S902, and if not, the processing moves to step S904.

In step S902, based on the specified shutter speed TV, the system control unit 103 determines the accumulation time to be set for the image sensor 101 as a first accumulation time according to the present invention. To be more specific, the system control unit 103 determines the longest accumulation time, among the accumulation times that can be set during live view, which does not exceed the specified shutter speed TV, as the accumulation time to be set for the image sensor 101. In other words, when the camera is in live view and the shutter speed is longer than the threshold TVth, the accumulation time to be set for the image sensor 101 is determined through the first determination method.

Then, in step S903, the system control unit 103 sets the offset ΔK, used to derive the digital gain AccumGain for the exposure, to 0, and stores that value in the memory 104.

On the other hand, if the specified shutter speed TV is not longer than the threshold TVth, in step S904, based on the specified shutter speed, the system control unit 103 determines the accumulation time to be set for the image sensor 101 as the first accumulation time according to the present invention. To be more specific, the system control unit 103 determines the accumulation time, among the accumulation times that can be set during live view, which has the smallest difference from the specified shutter speed TV, as the accumulation time to be set for the image sensor 101. As described above, the accumulation time to be selected in this step also includes an accumulation time that exceeds the specified shutter speed TV, and the accumulation time closest to the shutter speed in question is selected. In other words, when the camera is in live view and the shutter speed is not longer than the threshold TVth, the accumulation time to be set for the image sensor 101 is determined through the second determination method.

Then, in step S905, the system control unit 103 sets the offset ΔK, used to derive the digital gain AccumGain for the exposure, to a predetermined value greater than 0, and stores that value in the memory 104. Here, the predetermined value is a fixed value that is set in advance such that the digital gain AccumGain for the exposure to be derived later is not a negative direction digital gain.

Once the accumulation time and the offset ΔK to be set for the image sensor 101 are determined, in step S906, the system control unit 103 derives the target exposure for image capturing during live view. Specifically, the image sensor 101 derives the target exposure (BV+ΔK) by adding the offset ΔK to the photometric value BV derived in step S701.

In step S907, the system control unit 103 performs exposure calculation based on the target exposure derived in step S906 and the specified shutter speed TV, and derives the exposure control values for aperture and sensitivity (AV and SV), after which the processing moves to step S803.

Once the analog gain for the sensitivity is determined in step S803, in step S908, the system control unit 103 determines the digital gain to be applied to the digital image signal (the captured image) obtained from the image capturing. To be more specific, the system control unit 103 derives the digital gain SVDig pertaining to the sensitivity for compensating for the degree of exposure that is insufficient with the analog gain derived in step S803. The system control unit 103 also derives the digital gain AccumGain for the exposure to compensate for the degree of exposure that is insufficient with the accumulation time determined in step S902 or step S904. When deriving the digital gain AccumGain for the exposure in question, the offset ΔK is added to the digital gain for compensating for the exposure corresponding to the specified shutter speed. The system control unit 103 then multiplies the derived digital gains (SVDig and AccumGain) to determine the digital gain ultimately applied to the digital image signal.

After executing the exposure calculation processing for still image shooting or live view in this manner, the system control unit 103 sets the accumulation time and analog gain determined in the exposure calculation processing in the image sensor 101 in step S705 of the image capturing processing, and causes the image sensor 101 to capture an image based thereon. At this time, the system control unit 103 transmits the exposure control value AV for the aperture to the image capturing lens 200 and causes the aperture control unit 205 to control the aperture stop 204. When an image is captured by the image sensor 101, the signal processing unit 102 A/D-converts the output analog image signal and generates a digital image signal.

In step S706, the system control unit 103 performs processing for applying digital gain to the digital image signal generated in step S705. Note that as described above, digital gain is not derived in the exposure control processing for still image shooting as described above, and thus the processing of this step is only performed during live view. In other words, to reduce the S/N ratio of the still image to be recorded, the processing of reducing the exposure difference by applying digital gain is not executed during still image shooting.

By doing so, according to the image capturing apparatus of the present embodiment, the difference in the accumulation time of the image sensor 101 between live view and still image shooting in the high-frequency flickerless mode can be reduced, which makes it possible to shoot still images with the influence of flicker favorably reduced.

In the image capturing processing of the present embodiment, a method of varying the method for determining the accumulation time according to the specified shutter speed only when the high-frequency flickerless mode is set has been described, but the present invention is not limited thereto. In other words, the present invention can be applied in any situation where the control cycle of the charge accumulation of the image sensor is varied between live view and still image shooting, and it is therefore possible to achieve an effect in which a live view display having a reduced exposure difference from recorded still images can be provided. For example, if the thinning of the number of readout lines of the image sensor in live view thins more than one line, the influence of flicker at a lower frequency than that of an LED light source can occur, and this can be reduced by applying the present invention. Accordingly, the present invention can realize a live view display that is close to the exposure conditions of the still image to be recorded regardless of the frequency of flicker.

First Variation

The foregoing embodiment described deriving, during live view, the digital gain by adding the offset ΔK, which is a fixed value, to a shutter speed at which an accumulation time longer than the specified shutter speed can be set, but the present invention is not limited thereto. As indicated by the solid line 602 in FIG. 6, the degree of exposure difference based on the difference between the specified shutter speed and the accumulation time set in accordance therewith varies depending on the shutter speed and the specifications of the image sensor. Accordingly, the digital gain for exposure may be derived by adding the offset ΔK only when it is necessary to apply negative direction digital gain (called "reference gain" hereinafter) to reduce the stated exposure difference when the target exposure is not controlled. In other words, the digital gain for exposure having the offset added, and the target exposure having the offset added, may be derived only at shutter speeds where the reference gain is no greater than 0.

Here, a favorable reduction in the exposure difference is sufficient as long as the digital gain for exposure is not set to a negative direction digital gain and the negative amount is set as the offset at the shutter speed when a reference gain becomes a negative value. In this case, the offset ΔK can be derived using the determined accumulation time Accum- Time for the specified shutter speed TV (at which the reference gain becomes a negative value).

$$\Delta K = \log_2 \frac{TV_{user}}{AccumTime}$$

This makes it possible to eliminate the digital gain for exposure by using an offset ΔK that cancels out the negative amount of the reference gain. In other words, the offset need not be a fixed value, and may instead be a value that is derived dynamically according to the shutter speed.

Second Variation

The foregoing embodiment described switching the method of determining the accumulation time and whether or not to add an offset to the digital gain for exposure being performed according to whether or not the specified shutter speed is longer than the threshold TVth, which is determined based on the visibility of differences in the influence of flicker. However, the present invention is not limited thereto, and the switching of the method of determining the accumulation time and the switching of whether or not to add an offset to the digital gain for exposure may be controlled independently. For example, in view of the fact that the S/N ratio of a captured image may be drop when a digital gain having a fixed value offset is applied, the offset may be controlled to vary in steps according to the shutter speed, taking into account the estimated degree of the negative amount of the reference gain. In such a case, the degree of the negative amount of the reference gain is small when the shutter speed is long, and thus the configuration may be such that the accumulation time of the image sensor is determined through the second determination method regardless of the shutter speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-078082, filed Apr. 30, 2021, which is hereby incorporated by reference herein in its entirety.

What is claimed is:

1. An exposure control apparatus comprising:
at least one processor or circuit configured to function as:
an accepting unit configured to accept a specification of a shutter speed;
a first determination unit configured to, based on the specified shutter speed, determine a first accumulation time in which an image sensor accumulates a charge for image capture during a live view;
a second determination unit configured to, based on the specified shutter speed, determine a second accumulation time in which the image sensor accumulates a charge for image capture when obtaining a still image; and
a control unit configured to control the image sensor to accumulate a charge over the first accumulation time determined by the first determination unit or the second accumulation time determined by the second determination unit,
wherein the first determination unit:
determines the first accumulation time from accumulation times, among accumulation times that can be set during the live view, that do not exceed the specified shutter speed, when the specified shutter speed is longer than the predetermined shutter speed; and
determines the first accumulation time from accumulation times, among accumulation times that can be set during the live view, including accumulation times that exceed the specified shutter speed, when the specified shutter speed is not longer than the predetermined shutter speed.

2. The exposure control apparatus according to claim 1, wherein the first determination unit determines, as the first accumulation time, an accumulation time, among accumulation times that can be set during the live view, that is a longest accumulation time not exceeding the specified shutter speed, when the specified shutter speed is longer than the predetermined shutter speed.

3. The exposure control apparatus according to claim 1, wherein the first determination unit determines, as the first accumulation time, an accumulation time, among accumulation times that can be set during the live view, that is closest to the specified shutter speed, when the specified shutter speed is not longer than the predetermined shutter speed.

4. The exposure control apparatus according to claim 1, wherein the at least one processor or circuit is further configured to function as:
an adjustment unit configured to apply a digital gain to an image signal captured by the image sensor at least during live view; and
a third determination unit configured to determine the digital gain to be applied by the adjustment unit based on the specified shutter speed.

5. The exposure control apparatus according to claim 4, wherein the third determination unit:
determines the digital gain as a value that adjusts a signal value of the image signal to a value equivalent to an exposure at the specified shutter speed, when the specified shutter speed is longer than the predetermined shutter speed; and determines the digital gain as a value, obtained by adding a predetermined offset to a value that adjusts a signal value of the image signal to a value equivalent to an exposure at the specified shutter speed, when the specified shutter speed is not longer than the predetermined shutter speed.

6. The exposure control apparatus according to claim 5, wherein the at least one processor or circuit is further configured to function as:

an obtainment unit configured to obtain a photometric value; and an exposure control unit configured to perform exposure control related to image capture based on the photometric value obtained by the obtainment unit, wherein when the digital gain is determined having added the predetermined offset, the exposure control unit performs exposure control by changing the photometric value based on the predetermined offset.

7. The exposure control apparatus according to claim 5, wherein the predetermined offset is determined such that a signal value after the digital gain is applied exceeds the signal value of the image signal.

8. The exposure control apparatus according to claim 1, wherein the second determination unit determines, as the second accumulation time, an accumulation time, among accumulation times that can be set when obtaining a still image, that is closest to the specified shutter speed.

9. The exposure control apparatus according to claim 1, wherein a step width of an accumulation time that can be set during live view is greater than a step width of an accumulation time that can be set when obtaining a still image.

10. The exposure control apparatus according to claim 9, wherein the predetermined shutter speed is set based on the step width of the accumulation time that can be set during live view.

11. The exposure control apparatus according to claim 1, further comprising:

a setting unit configured to set whether or not to perform processing for reducing influence of flicker caused by a light source disposed in a shooting environment, wherein the first determination unit varies a method of determining the first accumulation time according to whether or not the specified shutter speed is longer than the predetermined shutter speed when the setting unit has set the processing for reducing the influence of flicker to be performed.

12. An image capturing apparatus comprising:

the exposure control apparatus according to claim 1;

an image capturing unit configured to capture an image using the image sensor; and a recording unit configured to record a still image obtained by image capturing when obtaining a still image.

13. A computer-readable recording medium in which is stored a program for causing a computer to function as the units of the exposure control apparatus according to claim 1.

14. A control method of an exposure control apparatus, the method comprising:

accepting a specification of a shutter speed;

determining, based on the specified shutter speed, a first accumulation time in which an image sensor accumulates a charge for image capture during a live view;

determining, based on the specified shutter speed, a second accumulation time in which the image sensor accumulates a charge for image capture when obtaining a still image; and controlling the image sensor to accumulate a charge over the first accumulation time or the second accumulation time, wherein the first accumulation time is determined from accumulation times, among accumulation times that can be set during the live view, that do not exceed the specified shutter speed, when the specified shutter speed is longer than the predetermined shutter speed, and the first accumulation time is determined from accumulation times, among accumulation times that can be set during the live view, including accumulation times that exceed the specified shutter speed, when the specified shutter speed is not longer than the predetermined shutter speed.

15. The exposure control apparatus according to claim 1, wherein the accumulation time that can be set in the image sensor differs between during the live view and when obtaining a still image.

* * * * *